(12) United States Patent
Ito

(10) Patent No.: US 9,461,494 B2
(45) Date of Patent: Oct. 4, 2016

(54) POWER STORAGE SYSTEM

(75) Inventor: Satoshi Ito, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 275 days.

(21) Appl. No.: 13/818,336

(22) PCT Filed: Jul. 19, 2011

(86) PCT No.: PCT/JP2011/066303
§ 371 (c)(1),
(2), (4) Date: Feb. 22, 2013

(87) PCT Pub. No.: WO2012/026244
PCT Pub. Date: Mar. 1, 2012

(65) Prior Publication Data
US 2013/0154572 A1    Jun. 20, 2013

(30) Foreign Application Priority Data

Aug. 24, 2010    (JP) ................ 2010-186754

(51) Int. Cl.
*H02J 7/00* (2006.01)
*B60L 3/00* (2006.01)
(Continued)

(52) U.S. Cl.
CPC ............ *H02J 7/0063* (2013.01); *B60L 3/0046* (2013.01); *B60L 3/04* (2013.01); *B60L 7/12* (2013.01); *B60L 11/1805* (2013.01); *B60L 11/1855* (2013.01); *B60L 11/1861* (2013.01); *B60L 11/1864* (2013.01); *B60L 11/1872* (2013.01); *H01M 10/441* (2013.01); *B60L 2200/26* (2013.01); *B60L 2210/10* (2013.01); *B60L 2210/30* (2013.01); *B60L 2240/421* (2013.01); *B60L 2240/423* (2013.01); *B60L 2240/545* (2013.01); *B60L 2240/547* (2013.01); *B60L 2240/549* (2013.01); *H02J 7/0014* (2013.01); *Y02T 10/642* (2013.01); *Y02T 10/7005* (2013.01); *Y02T 10/7044* (2013.01); *Y02T 10/7055* (2013.01); *Y02T 10/7061* (2013.01);
(Continued)

(58) Field of Classification Search
USPC ....................................... 320/126
See application file for complete search history.

(56) References Cited

U.S. PATENT DOCUMENTS 6,208,039 B1    3/2001    Mendelsohn et al.
6,265,850 B1    7/2001    Kimura et al.
(Continued)

FOREIGN PATENT DOCUMENTS

DE    102008005208    7/2008
JP    9-298806 A    11/1997
(Continued)

OTHER PUBLICATIONS

Japanese Office Action dated Aug. 19, 2014, which issued during the prosecution of Japanese Patent Application No. 2010-186754, which corresponds to the present application.
(Continued)

*Primary Examiner* — Eric Lee
(74) *Attorney, Agent, or Firm* — Troutman Sanders LLP

(57) ABSTRACT

An integration control device of a power storage system obtains pieces of status information of power storage devices from control devices of unit modules, compares the obtained pieces of status information with one another, and performs driving control of an electrical load based on a worst value of the pieces of status information.

1 Claim, 2 Drawing Sheets

(51) Int. Cl.
  *B60L 3/04* (2006.01)
  *B60L 7/12* (2006.01)
  *B60L 11/18* (2006.01)
  *H01M 10/44* (2006.01)

(52) U.S. Cl.
  CPC ......... *Y02T 10/7216* (2013.01); *Y02T 10/7241* (2013.01)

(56) References Cited

U.S. PATENT DOCUMENTS

| | | | |
|---|---|---|---|
| 7,553,583 | B2 | 6/2009 | Eaves |
| 7,598,706 | B2 | 10/2009 | Koski et al. |
| 2008/0180061 | A1 | 7/2008 | Koski et al. |
| 2010/0188045 | A1* | 7/2010 | Colello et al. ............... 320/118 |

FOREIGN PATENT DOCUMENTS

| | | |
|---|---|---|
| JP | 2001-95163 A | 4/2001 |
| JP | 2004-28861 A | 1/2004 |
| JP | 2004-31014 A | 1/2004 |
| JP | 2004-31123 A | 1/2004 |
| JP | 2005-168259 A | 6/2005 |
| JP | 4057193 | 3/2008 |
| JP | 2008-148485 A | 6/2008 |
| JP | 2008-153150 A | 7/2008 |
| JP | 2008-226511 | 9/2008 |
| JP | 2009-33936 A | 2/2009 |

OTHER PUBLICATIONS

International Preliminary Report on Patentability, dated Mar. 19, 2013, which issued during the prosecution of International Patent Application PCT/JP2011/066303, which corresponds to the present application.

International Search Report, dated Oct. 18, 2011, which issued during the prosecution of International Patent Application No. PCT/JP2011/066303, of which the present application is the national phase.

German Office Action dated Dec. 3, 2014, which issued during prosecution of German Application No. 112011102788.5, which corresponds to the present application.

* cited by examiner

POWER STORAGE SYSTEM

CROSS-REFERENCE TO RELATED APPLICATIONS

This is a U.S. national phase application under 35 U.S.C. §371 of International Patent Application No. PCT/JP2011/066303, filed on Jul. 19, 2011, and claims benefit of priority to Japanese Patent Application No. 2010-186754, filed Aug. 24, 2010. The International Application was published on Mar. 1, 2012 as International Publication No. WO 2012/026244 under PCT Article 21(2). The entire contents of these applications are hereby incorporated by reference.

TECHNICAL FIELD

This invention relates to a power storage system, and more particularly to a power storage system which has power storage devices connected in parallel and performs power supply management and limitation control of an electrical load.

BACKGROUND ART

Some of power storage systems conventionally used as emergency power supply devices or the like has a plurality of power storage devices connected in parallel in order to increase a power storage capacity. A current is input/output to/from this power storage system so as not exceed performance of the power storage devices.

A parallel-connection power storage system according to Patent Literature 1 has a plurality of switches which connect/disconnect corresponding power storage elements to/from the system, a voltage monitoring means which detects a voltage difference among the plural power storage elements, and a control means which, when the detected voltage difference is within a predetermined value in one of or a plurality of the power storage element arrays, turns on only the switch(es) corresponding to the relevant power storage element array(s), thereby preventing a trouble such as overcurrent at the time of parallel energization.

A method of abnormality detection when parallel batteries are used according to Patent Literature 2 is a method in which, in a battery parallel-connection circuit in which serially connected secondary batteries are connected in parallel, temperature of each of the batteries is detected, and based on a temperature difference between the batteries, an abnormality such as overcharge•over-discharge of the circuit is detected.

A control device of a plurality of parallel batteries sharing a load current according to Patent Literature 3 controls the plural batteries connected in parallel so that they share a load element equally.

A voltage detecting method and a voltage detecting device of parallel-connected batteries according to Patent Literature 4 use an internal resistance value of a cell, a voltage of the cell under a load, and a current value of the cell to estimate an open-circuit voltage value of each of electric cells connected in parallel.

In a method and a device of calculating a maximum charge/discharge power of a battery pack including parallel-connected batteries according to Patent Literature 5, in calculating the maximum discharge power of the battery pack, the maximum discharge power of the battery pack is calculated according to a discharge power of the parallel batteries at which a maximum discharge power of each of the parallel batteries becomes the smallest, and in calculating the maximum charge power of this battery pack, the maximum charge power of the battery pack is calculated according to a discharge power of the parallel batteries at which a maximum charge power of each of the parallel batteries becomes the smallest, whereby the maximum charge/discharge power is calculated so as to use the batteries connected in parallel in an appropriate region.

A method and a device of calculating a capacity of a parallel-connection battery pack according to Patent Literature 6 calculate internal resistances of batteries connected in parallel and add a correction coefficient thereto, thereby calculating the capacity of the battery in consideration of states of electric cells.

In a parallel battery pack according to Patent Literature 7, a switch and an internal resistance detecting means detecting an internal resistance of each battery are provided in each line of the battery, and the line where a cell whose internal resistance value is over a set value exists is disconnected, thereby preventing a decrease of a usable capacity caused by the deteriorated battery.

CITATION LIST

Patent Literature

Patent Literature 1: Japanese Laid-open Patent Publication No. 2009-33936
Patent Literature 2: Japanese Patent No. 4057193
Patent Literature 3: Japanese Laid-open Patent Publication No. 2001-95163
Patent Literature 4: Japanese Laid-open Patent Publication No. 2004-28861
Patent Literature 5: Japanese Laid-open Patent Publication No. 2004-31014
Patent Literature 6: Japanese Laid-open Patent Publication No. 2004-31123
Patent Literature 7: Japanese Laid-open Patent Publication No. 2008-153150

SUMMARY OF INVENTION

Technical Problem

However, in a power storage device of a hybrid vehicle, an electric vehicle, and the like whose development has been recently progressing, a large current close to performance limit is forced to be input/output under a condition such as a temperature environment severe for the power storage device. For example, when a power storage system in which power storage devices are connected in parallel is mounted in a hybrid vehicle, an electric vehicle, and the like, it is necessary to constantly monitor the power storage devices, which has an inconvenience that the control of the whole system becomes complicated.

Therefore, it is an object of the present invention to provide a power storage system which can facilitate the management of a plurality of power storage devices, can be a system capable of easily increasing/decreasing the number of parallel connections of the power storage devices and thus having high scalability, and capable of configuring management control of the plural power storage devices.

Solution to Problem

The invention is a power storage system including: a plurality of unit modules connected in parallel, the unit modules each composed of a power storage device and a control device capable of managing a status of the power storage device; an electrical load whose driving is controlled by using powers of the power storage devices; and an integration control device connected to the electrical load and the control devices of the unit modules, wherein the integration control device obtains status information of each of the power storage devices from the control device of each of the unit modules, and compares the obtained pieces of status information with one another to control the driving of the electrical load based on a worst value of the pieces of status information.

Advantageous Effects of Invention

The power storage system of this invention can facilitate the management of the plural power storage devices, can be a system capable of easily increasing/decreasing the number of the parallel connections of the power storage devices and thus having high scalability, and can configure management control of the plural power storage devices.

DESCRIPTION OF EMBODIMENTS

The present invention realizes the objects to facilitate the management of a plurality of power storage devices, configure a system capable of easily increasing/decreasing the number of the parallel connections of the power storage devices and thus having high scalability, and configure management control of the plural power storage devices, by configuring a control system in which power storage devices are connected in parallel so that a specification change represented by a capacity change can be facilitated.

EXAMPLES

Figure 1:
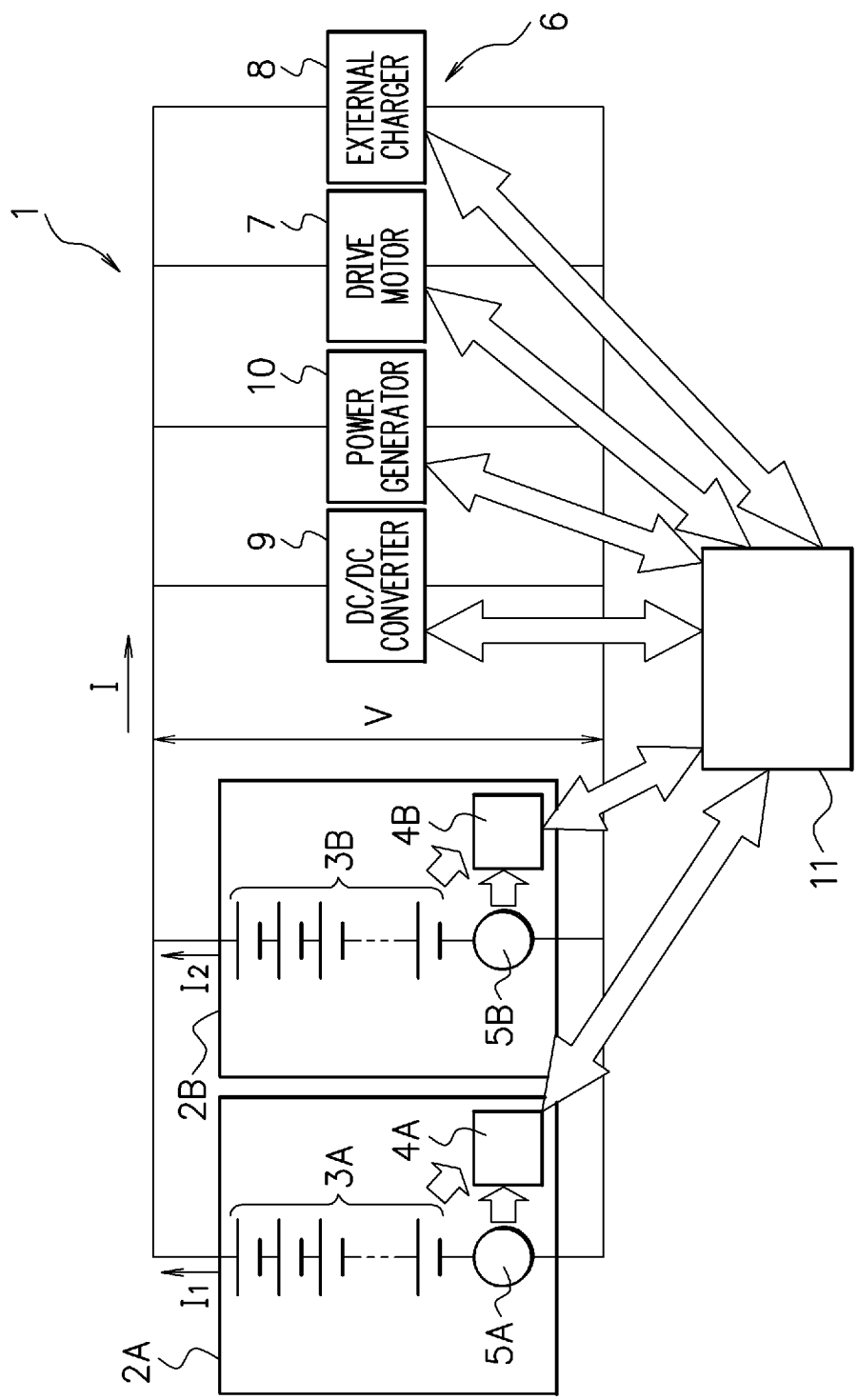
FIG. 1 is a block diagram of a power storage system (example).

FIG. 1 shows an example of this invention.

In FIG. 1, 1 denotes a power storage system mounted on a vehicle such as a hybrid vehicle or an electric vehicle.

The power storage system 1 includes a first unit module 2A and a second unit module 2B as a plurality of unit modules connected in parallel.

The first unit module 2A includes a first power storage device (high-voltage battery) 3A, a first control device (battery controller) 4A capable of managing a status of the first power storage device 3A, and a first status information detecting device (sensor) 5A which detects status information. The first status information detecting device 5A detects a current•a total voltage•a cell voltage•a temperature, and so on as the status information of the first unit module 2A and outputs the detected status information to the first control device 4A.

The second unit module 2B includes a second power storage device (high-voltage battery) 3B, a second control device (battery controller) 4B capable of managing a status of the second power storage device 3B, and a second status information detecting device (sensor) 5B which detects status information. The second status information detecting device 5B detects a current•a total voltage•a cell voltage•a temperature, and so on as the status information of the second unit module 2B and outputs the detected status information to the second control device 4B.

The first power storage device 3A and the second power storage device 3B are of the same type, and the first unit module 2A and the second unit module 2B are connected in parallel. Therefore, amounts of currents flowing to the first power storage device 3A and the second power storage device 3B are substantially equal.

The first control device 4A of the first unit module 2A•the second control device 4B of the second unit module 2B obtain the currents•the total voltages•the cell voltages•the temperatures and so on as the pieces of status information of the first power storage device 3A•the second power storage device 3B from the first status information detecting device (sensor) 5A•the second status information detecting device (sensor) 5B to output the pieces of status information to a later-described integration control device 11.

Further, in the power storage system 1, in parallel connection with the first unit module 2A and the second unit module 2B, a drive motor 7 and an external charger 8 as electrical loads 6 whose driving is controlled by using powers of the first power storage device 3A•the second power storage device 3B are provided and also a DC/DC converter 9 and a power generator 10 are provided.

The first control device 4A of the first unit module 2A, the second control device 4B of the second unit module 2B, the drive motor 7, the external charger 8, the DC/DC converter 9, and the power generator 10 are connected to the integration control device 11.

The integration control device 11 obtains the pieces of status information of the first power storage device 3A of the first unit module 2A•the second power storage device 3B of the second unit module 2B from the first control device 4A of the first unit module 2A•the second control device 4B of the second unit module 2B to compare the obtained pieces of status information of the first power storage device 3A•the second power storage device 3B with one another and also controls the driving of the electrical load 6 and so on based on a worst value of the pieces of status information.

The "worst value" here means the "worst value" for the first power storage device 3A•the second power storage device 3B. For the first power storage device 3A•the second power storage device 3B, regular ranges of the status information such as the voltage, the temperature, and so on are defined as specifications thereof. Among variables of the status information such as the voltage•the temperature, and so on of the first power storage device 3A•the second power storage device 3B which are connected in parallel, one whose deviation degree is the largest becomes the "worst value". In particular, one whose deviation degree from the regular range (usable range) thereof is the largest is defined as the "worst value". That is, the "worst value" means that the relevant power storage device 3A, 3B is in a state of approaching a region where the limitation is gradually applied (=a region where the integration control device 11 should execute limitation control (to be described later), though being the usable region), and also means that it is in a state where it should not be used when deviating from the region where the limitation is gradually applied. In normal use, various kinds of limitations do not work if all the pieces of status information of the first power storage device 3A•the second power storage device 3B fall within the regular ranges. When the variable of the status information of one unit module falls out of the regular range, the limitation becomes strict in one of the later-described limitation controls due to this unit module. Consequently, the variable of the status information falling out of the regular range of this one unit module becomes the "worst value". The power storage system 1 considers a unit module having a relatively high status level as being equal in level to a unit module having a relatively low status level, and therefore operates while reducing a total load of the system.

When the variables of the plural pieces of status information fall out of the regular ranges, a value with the largest deviation degree becomes the "worst value". In the normal use, the deviation of the variables of the status information from the regular ranges gradually occurs in order of the deviation degree from the variable with the "worst value". Therefore, the limitation is applied to the unit modules in order accordingly.

Concretely, the integration control device 11 executes the limitation controls of the electrical load 6 and so on as shown in the following (1)~(7).

(1) Current Limitation

Current limit values of the first control device 4A of the first unit module 2A•the second control device 4B of the second unit module 2B include discharge current limit values and charge current limit values of the first unit module 2A•the second unit module 2B.

Then, in order to materialize the current limitation as the limitation control, the integration control device 11 performs the control so that an average current equal to the sum of all the currents of the first unit module 2A•the second unit module 2B divided by the number of the unit modules falls between a maximum value of the discharge current limit values in the current limitation and a minimum value of the charge current limit values in the current control.

That is, the integration control device 11 performs the control so that the following relation holds, where $Id_n$ and $Ic_n$ are the discharge current limit value and the charge current limit value of the unit module n respectively, and I is the sum of the currents of all the unit modules.

$$(Id_1, Id_2, \ldots Id_n)_{max} \leq I/n \leq (Ic_1, Ic_2, \ldots Ic_n)_{min}$$

Note that a charge direction of the current value is + and its discharge direction is −.

Such limitation control makes it possible to enlarge and reduce the scale of the system, which can ensure scalability of a capacity. Further, the first power storage device 3A•the second power storage device 3B are connected in parallel and thus each of them is independently disconnectable. Therefore, this power storage system 1 becomes a multiplexed system and can be an easy-to-use fault-tolerant system (redundancy).

(2) Total Voltage Limitation

The integration control device 11 performs the control so that the following relations hold, where Vh and Vl are a highest total voltage limit value and a lowest total voltage limit value as the whole system respectively, and $V_n$ is a total voltage of the unit module n.

$$(V_1, V_2, \ldots V_n)_{max} \leq Vh$$

$$(V_1, V_2, \ldots V_n)_{min} \geq Vl$$

(3) Cell Voltage Limitation

The integration control device 11 performs the control so that the following relations hold, where Vch and Vcl are a highest voltage limit value and a lowest voltage limit value for cells of the first power storage device 3A•the second power storage device 3B respectively, $Vch_n$ and $Vcl_n$ are a highest cell voltage and a lowest cell voltage of the unit module n.

$$(Vch_1, Vch_2, \ldots Vch_n)_{max} \leq Vch$$

$$(Vcl_1, Vcl_2, \ldots Vcl_n)_{max} \geq Vcl$$

(4) SOC (State of Charge: Value of Charge State Actually Usable) Limitation

The first control device 4A of the first unit module 2A•the second control device 4B of the second unit module 2B each calculate the current limit value and a SOC from the status information including the current, the voltage, and the temperature, and output the status information and the calculated current limit value and SOC to the integration control device 11.

Then, the integration control device 11 compares the pieces of status information, the current limit values, and the SOCs of the first unit module 2A and the second unit module 2B with one another to extract the worst value, and performs the limitation control of the driving of the electrical load 6 based on the worst value.

That is, the first control device 4A•the second control device 4B calculate the SOCs of the cells in the first unit module 2A•the second unit module 2B from the pieces of status information such as the currents, the voltages, and so on, and output these data to the integration control device 11. The integration control device 11 obtains the data to recognize them.

The SOCs of the first control device 4A•the second control device 4B of the first unit module 2A•the second unit module 2B include the highest SOCs and the lowest SOCs of the first unit module 2A•the second unit module 2B.

Then, in order to materialize the SOC limitation as the limitation control, the integration control device 11 sets a highest SOC limit value and a lowest SOC limit value of the first unit module 2A•the second unit module 2B in advance, and performs the control so that a maximum value among the highest SOCs of the first unit module 2A•the second unit module 2B becomes smaller than the highest SOC limit value and a minimum value among the lowest SOCs of the first unit module 2A•the second unit module 2B becomes larger than the lowest SOC limit value.

Here, the integration control device 11 performs the control so that the following relations hold, where SOCh and SOCl are the highest SOC limit value and the lowest SOC limit value as the whole system, $SOCh_n$ is the highest SOC being the highest value of the SOC of the unit module n, and $SOCl_n$ is the lowest SOC being the lowest value of the SOC of the unit module n thereof.

$$(SOCh_1, SOCh_2, \ldots SOCh_n)_{max} \leq SOCh$$

$$(SOCl_1, SOCl_2, \ldots SOCl_n)_{max} \geq SOCl$$

Such limitation control makes it possible to ensure accuracy of abnormality detection of the first power storage device 3A•the second power storage device 3B.

(5) Temperature Limitation

The integration control device 11 performs the control so that the following relation holds, where Th is a highest temperature limit value as the whole system, and $Th_n$ is a highest cell temperature of the unit module n (drive motor output limitation and so on).

$$(Th_1, Th_2, \ldots Th_n)_{max} \leq Th$$

(6) Current Variation Limitation

The integration control device 11 performs the control so that the following relation holds, where $\Delta I_{max}$ is a maximum tolerance value of variation in the current between the first power storage device 3A and the second power storage device 3B, and $I_n$ is the current of the unit module n (drive motor output limitation and so on).

$$(I_1, I_2, \ldots I_n)_{max} - (I_1, I_2, \ldots I_n)_{min} \leq \Delta I_{max}$$

At this time, when the current variation is excessively large, the integration control device 11 determines that the system has an abnormality.

(7) Temperature Variation Limitation

The integration control device 11 performs the control so that the following relation holds, where $\Delta T_{max}$ is a maximum tolerance value of temperature variation between the first power storage device 3A and the second power storage device 3B and $Th_n$ is a highest cell temperature of the unit module n (drive motor output limitation and so on).

$$(Th_1, Th_2, \ldots Th_n)_{max} - Th_1, Th_2, \ldots Th_n)_{min} \leq \Delta T_{max}$$

(8) Cooling Fan Control

When the first power storage device 3A•the second power storage device 3B each independently do not have a cooling system, the integration control device 11 controls a cooling fan based on a maximum value $(Th_1, Th_2, \ldots Th_n)_{max}$ among the highest cell temperatures.

In the above-described limitation controls, in order for all the relations of the current•the voltage•the charge ratio and so on in the limitation controls (1)~(7) except the cooling fan control (8) to keep holding, the integration control device 11 basically performs the control so as to operate the cooling system, here the cooling fan (according to the specification) after controlling the system within the regular ranges of the charge ratio•the current of the battery specification.

Consequently, a frequency of the application of the other limitations (the limitations (1)~(7)) decreases. However, since external charge is often controlled based on voltage, the voltages of the power storage devices are sometimes positively used for the control.

The limitation controls according to this example will be described in more detail.

As the limitation control, the integration control device 11 performs mainly torque limitation of the drive motor 7 when any of the above limitations (1) to (7) is not realized at the time of a request for the driving of the drive motor 7.

Normally, the drive motor 7 used in the exemplified hybrid vehicle operates under torque control, and therefore a measure for the various kinds of limitations is only the torque limitation. The way to apply the torque limitation varies and includes strict adjustment to a limit value, limitation with allowance, and so on. The way to apply the torque limitation will be described below along the above-described limitation controls (1)~(7).

(1) Current Limitation

The integration control device 11 calculates a usable power from the current limit values and the voltages, divides the usable power by a motor rotation speed to decide a torque limit value, and controls an actual drive torque for powering/regeneration within the torque limit value. A torque control value at this time is the torque limit value at the maximum and becomes a desired value reflecting an intention of a driver, which is equal to or lower than the torque limit value.

(2) Total Voltage Limitation

A map of the usable power for the total voltage is set. The map is set so that a charge power becomes small when the total voltage is high and a discharge power becomes small when the total voltage is low. The integration control device 11 divides a value (power) read from the map by the motor rotation speed to decide the torque limit value, and controls the actual drive torque for the powering/regeneration within the torque limit value. A torque control value at this time is the torque limit value at the maximum and becomes a desired value reflecting an intention of the driver, which is equal to or lower than the torque limit value.

(3) Cell Voltage Limitation

A map of a usable power for the cell voltage is set. This map is set so that the charge power becomes small when the cell voltage is high and the discharge power becomes small when the cell voltage is low. The integration control device 11 divides a value (power) read from the map by the motor rotation speed to decide the torque limit value and controls the actual drive torque for the powering/regeneration within the torque limit value. A torque control value at this time is the torque limit value at the maximum and becomes a desired value reflecting an intention of the driver, which is equal to or lower than the torque limit value.

(4) SOC Limitation

A map of powering/regeneration limit ratios for the SOC is set. This map is set so that the regeneration limit ratio becomes large when the SOC is high and the powering limit ratio becomes large when the SOC is low. The integration control device 11 multiplies a torque requirement by a value (powering/regeneration limit ratio) read from the map and sets the resultant value as a final torque requirement. A torque control value at this time becomes the torque limit value.

In this case, the integration control device 11 normally adjusts the SOC within a range where this limitation is not applied. For example, the integration control device 11 increases a power generation amount when the SOC becomes low, and on the other hand, when the SOC becomes high, it performs the control so as to prevent the power generation.

(5) Temperature Limitation

A map of a usable power absolute value is set for the temperature of the first unit module 2A•the second unit module 2B. This map is set so that the charge power and the discharge power become small when the temperature is high. The integration control device 11 divides a value (power) read from the map by the motor rotation speed to decide the torque limit value, and controls the actual drive torque for the powering/regeneration within the torque limit value. A torque control value at this time is the torque limit value at the maximum and becomes a desired value reflecting an intention of the driver, which is equal to or lower than the torque limit value.

In this case, the integration control device 11 normally controls the cooling fan so as not apply this limitation.

(6) Current Variation Limitation

A map of a usable power absolute value is set for the current variation (for example, a current deviation in a combination with the largest mutual current deviation). This map is set so that the charge power and the discharge power become small when the variation is large. The integration control device 11 divides a value (power) read from the map by the motor rotation speed to decide the torque limit value, and controls the actual drive torque for the powering/regeneration within the limit value. A torque control value at this time is the torque limit value at the maximum and becomes a desired value reflecting an intention of the driver, which is equal to or lower than the torque limit value.

In this case, when the current variation is excessively large, the power storage devices have an abnormality and therefore, the integration control device 11 determines that the system has an abnormality. It is promoted to stop the system, whereby the spread of the abnormality is prevented.

(7) Temperature Variation Limitation

A map of a usable power absolute value is set for the temperature variation (for example, a temperature deviation in a combination with the largest mutual temperature deviation). This map is set so that the charge power and the discharge power become small when the variation is large. The integration control device 11 divides a value (power) read from the map by the motor rotation speed to decide the torque limit value, and controls the actual drive torque for the powering/regeneration within the torque limit value. A torque control value at this time is the torque limit value at the maximum and becomes a desired value reflecting an intention of the driver, which is equal to or lower than the torque limit value.

Further, in this example, the integration control device 11 may perform power generation limitation to the power generator 10 and external charge limitation to the external charger 8 in addition to the drive torque limitation to the drive motor 7. Among them, the power generation limitation to the power generator 10 and the external charge limitation to the external charger 8 limit the charging of the first power storage device 3A•the second power storage device 3B.

A plurality pieces of hardware as devices forming the system can cause these limitations to be realized or not, and there is a possibility that the limitations occur to these pieces of hardware. Further, the plural limitations sometimes occur in combination in a matrix manner, taking the number of the pieces of hardware and each of the above-described limitations (1)~(7) on the axes. When the integration control device 11 thus controls the "combination" of the pieces of hardware, the control becomes more complicated as the number of the hardware increases. Therefore, here, the integration control device 11 sets the aforesaid maps for each of the pieces of hardware and uses the maps for the control. Further, the integration control device 11 may perform the optimum limitation to the "combination" of the pieces of hardware. In this case, the complicated control is necessary, but on the other hand, by simplifying part of the operation of the system for streamlining, it is possible to do without the maps.

Further, when the plural limitations among the above-described limitations (1)~(7) are not realized, the integration control device 11 uses the worst value among the plural limit values.

For example, when the powering torque limit $\tau i$ (>0) by the total voltage limitation and the powering torque limit $\tau t$ (>0) by the temperature variation are both realized at the same time, the integration control device 11 sets the smallest value of $\tau i$ and $\tau t$ as the final powering torque limit value. That is, the integration control device 11 selects the torque control value with a smaller value indicating larger limitation, from the torque control values, and based on this, performs the control.

Further, when one of the unit modules is disconnected by the opening/closing of a switch (contactor) due to an abnormality, information (numerical value) regarding this unit module may be simply eliminated. However, a state where one of the unit modules has to be disconnected due to an abnormality is a state of emergency. Therefore, in such a case, a system (for example, a vehicle system) to which this power storage system 1 is applied shifts the state from normal-time control to abnormal-time control according to its characteristic. In this exemplified vehicle system, at an instant when one of the unit modules is disconnected, the state is shifted to escape running such as a "limp home mode".

The power storage system 1 in this example has the structure in which a complex of the power storage device 3A, the control device 4A, and the other constituent component (here, for example, the status information detecting device 5A), or a complex of the power storage device 3B, the control device 4B, and the other constituent component (here, for example, the status information detecting device 5B) is provided as the unit module, and the unit modules of the same type are connected in parallel. Therefore, the power storage system in this example can maintain system establishment with a minimum control change even when the number of the parallel connections of the unit modules is increased. Further, the power storage system 1 of this example is composed of the structure where the unit modules each functioning as the power storage device are connected in parallel as they are and the control element which integrally monitors them. Therefore, the power storage system 1 in this example can easily change the power storage capacity.

Therefore, the power storage system of this example can facilitate the management of the plural power storage devices, can be a system capable of easily increasing/decreasing the number of the parallel connections of the power storage devices and thus having high scalability, and can configure management control of the plural power storage devices.

Figure 2:
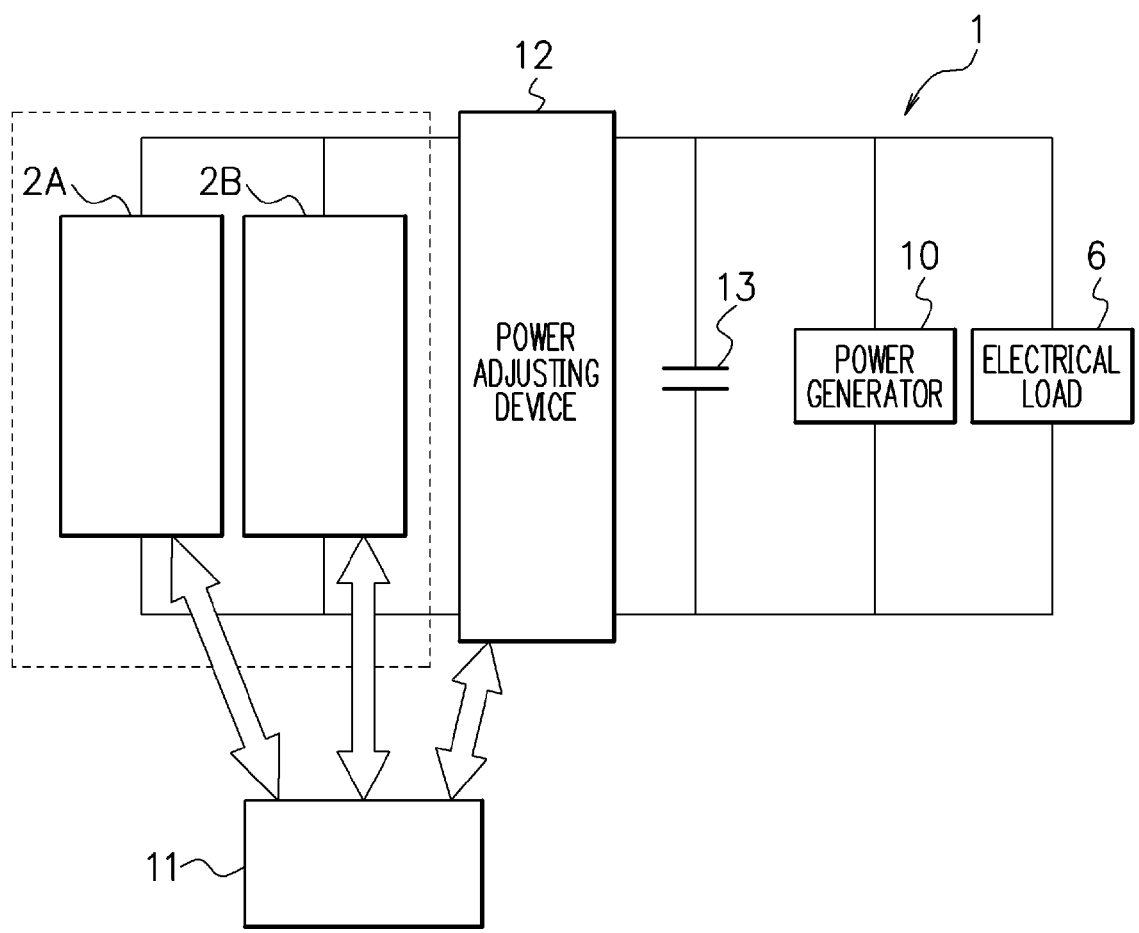
FIG. 2 is a block diagram of a power storage system (modification example).

FIG. 2 shows a modification example of this example.

A power storage system 1 is provided with not only a first unit module 2A and a second unit module 2B but also a power adjusting device 12, a capacitor 13, a power generator 10, and an electrical load 6. The first unit module 2A, the second unit module 2B, and the power adjusting device 12 are linked to the integration control device 11.

Consequently, it is possible to obtain the same effects as those of the above-described example and also to eliminate a need for controlling the whole system to simplify the control.

Incidentally, in this invention, the currents•voltages of the first unit module and the second unit module can be monitored also by the integration control device.

Further, the first control device•the second control device of the first unit module•the second unit module can also communicate with each other in order to take on part of the monitoring•controlling function by the integration control device.

Further, in the power storage system, capacitors can be used instead of the first power storage device•the second power storage device of the first unit module•the second unit module. However, when a unit module of the power storage device and a unit module of the capacitor co-exist in the same system, the integration control device performs the control, considering that the unit module of the power storage device and the unit module of the capacitor are unit modules of different kinds.

Furthermore, unit modules of different kinds can also be provided in the system in plurality.

Further, it is also possible to provide a control device integrally controlling the plural unit modules, on a hierarchy level under the integration control device.

It should be noted that all of the above-described embodiments only show concrete examples in carrying out the present invention. The technical scope of the present invention should not be construed in a limited manner by the above-described embodiments. That is, the present invention can be embodied in various forms without departing from its spirit.

INDUSTRIAL APPLICABILITY

The power storage system of this invention is applicable not only to an automobile but also to a system in which a power generator and power storage devices are mounted, such as an internal combustion vehicle, an auxiliary power supply system such as an uninterruptible power supply device, a buffer system of a small-scale power station, and the like.

The invention claimed is:

1. A power storage system comprising:
   a plurality of unit modules connected in parallel, the unit modules each composed of a power storage device and a control device capable of managing a status of the power storage device;
   an electrical load whose driving is controlled by using powers of the power storage devices; and
   an integration control device connected to the electrical load and the control devices of the unit modules,
   wherein the control device of each of the unit modules obtains a current, a voltage, and a temperature as the status information of the power storage device;
   wherein a current limit value calculated by the control device of each of the unit modules is based on the status information and includes a discharge current limit value and a charge current limit value of each of the unit modules; and
   wherein the integration control device:
   compares the obtained pieces of status information with one another and defines a worst value to control the driving of the electrical load,
   wherein the worst value is one of the pieces of status information that has the largest deviation degree from a regular range of the pieces of status information, and
   wherein the pieces of status information are the current, the voltage, and the temperature, and
   further performs the control so that an average current equal to a sum of the currents of all the unit modules divided by the number of the unit modules falls between a maximum value among the discharge current limit values in current limitation and a minimum value among the charge current limit values in the current limitation.

* * * * *